(No Model.)
A. O. FRICK.
Friction Brake.
No. 241,642. Patented May 17, 1881.
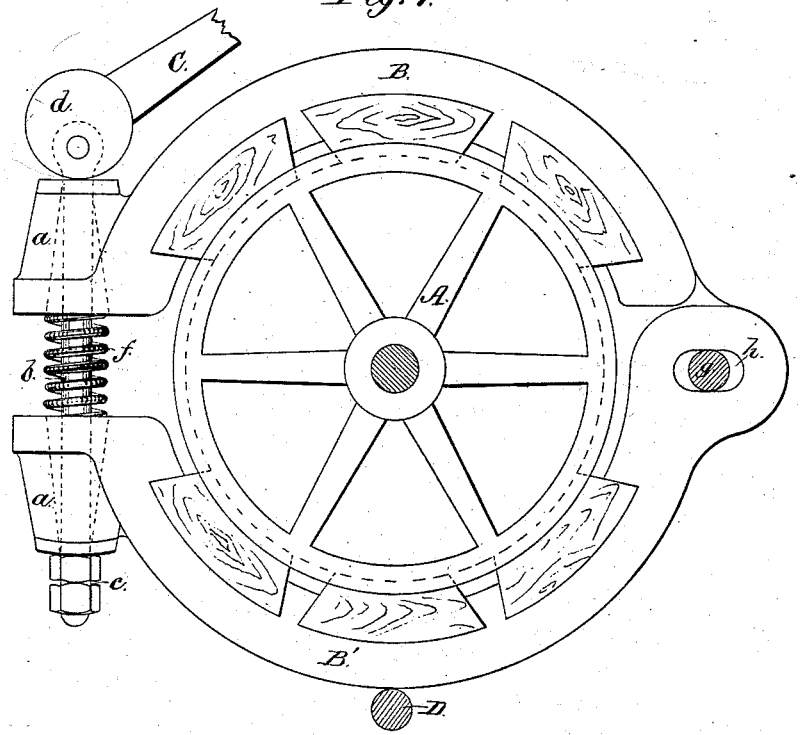
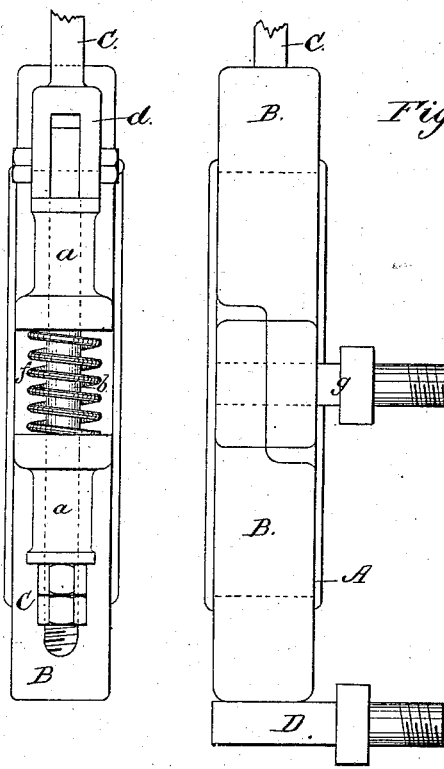
WITNESSES:
W. W. Hollingsworth
Edw. W. Byrn.
INVENTOR:
A. O. Frick
BY
ATTORNEYS.

UNITED STATES PATENT OFFICE.

ABRAHAM O. FRICK, OF WAYNESBOROUGH, PENNSYLVANIA.

FRICTION-BRAKE.

SPECIFICATION forming part of Letters Patent No. 241,642, dated May 17, 1881.

Application filed March 30, 1881. (No model.)

*To all whom it may concern:*

Be it known that I, ABRAHAM O. FRICK, of Waynesborough, Franklin county, Pennsylvania, have invented a new and useful Improvement in Friction-Brakes; and I do hereby declare that the following is a full, clear, and exact description of the same, reference being had to the accompanying drawings, forming part of this specification, in which—

Figure 1 is a side view, Fig. 2 a front-edge view, and Fig. 3 a rear-edge view.

My invention relates to certain improvements upon that form of friction-brake in which two segmental sections or shoes are made to bear against the opposite sides of the periphery of a wheel to arrest the movement of the latter.

The invention consists in the peculiar construction and arrangement of devices for adjusting the two ends of the shoes or segmental sections toward or from each other, and in the means for connecting the other two ends of these sections so as to compensate for wear and secure uniformity in the strain upon the wheel, all as hereinafter more fully described.

In the drawings, A represents a wheel upon the opposite sides of whose periphery are two semicircular segments or shoes, B B', provided upon their inner edges with inserted wooden blocks, which are capable of being replaced when worn out. The segmental shoes have at their outer ends enlargements *a a* through which passes a long link-rod, *b*. The lower end of this link-rod is screw-threaded and provided with nuts *c*, which form a shoulder which serves to draw the lower jaw or segment toward the upper one. To the upper end of this link-rod is jointed eccentrically the cam-head *d* of the lever C, which cam-head bears upon the upper end of the enlargement of the segment B, and serves, when turned, to draw the two ends of the segments B B' together and apply the brake to the wheel.

To throw the two segments away from the wheel when the pressure of the lever is removed, a spiral spring, *f*, is arranged between the ends of the said segments.

D is a stationary pin, which forms a support for the lower segment and affords a bearing which enables spring *f* to lift the upper segment away from the wheel. This pin is only to be used when the plane of the wheel is vertical, and it has special value in this connection, in that without it the upper segment would always drag on the wheel and wear from its own gravity, in spite of the spring *f*.

As the blocks of the segments wear the distance between the movable ends of the segments requires to be taken up in order to allow the lever to preserve the same range of adjustment, and for this purpose the two adjacent ends of the two segments are drawn together from time to time by the nuts *c*. To permit this adjustment without cramping the link-rod, the holes in the enlargements *a* of the segments through which the link-rod passes are made tapering on the two sides lying within the plane of the wheel, as shown in dotted lines in Fig. 1.

By means of the cam-head on the lever it will be seen that the brakes are held applied without special holding devices, the lever remaining wherever it is adjusted.

In a brake of this kind I have found that from unequal hardness of the wooden blocks and other causes some parts wear away faster than the others, and when this occurs an unequal pressure on the wheel is produced when the brakes are applied, which involves a lateral strain on the shaft. To avoid this I joint the two segments B B' together upon a fixed pin, *g*, by means of slots *h* whose lengths are radial to the wheel, so that if there be an unequal bearing on opposite sides of a vertical line passing through the axis of the wheel the segments slide in the direction of the length of their slot and automatically adapt themselves to such position as will give an equal bearing on all the wooden blocks.

Having thus fully described my invention, what I claim is—

1. The combination of the two semicircular segments connected together upon one side and having perforated ends at the other, the link-rod passing through said perforated ends, the screw-nut *c* arranged upon one end of the link-rod, and the cam-headed lever connected to the other end of the link-rod, and the spiral spring arranged between the ends of said segment and around the said link-rod, substantially as described.

2. The two friction segments or shoes B B, having slotted eyes $h$ arrranged radial to the wheel, combined with a fixed pin, $g$, substantially as described, and for the purpose set forth.

ABRAHAM O. FRICK.

Witnesses:
D. M. GOOD, Jr.,
C. E. BESON.